March 5, 1946.  A. S. LEVIN  2,395,932
BEVERAGE DISPENSING APPARATUS
Filed Oct. 3, 1940  2 Sheets-Sheet 1
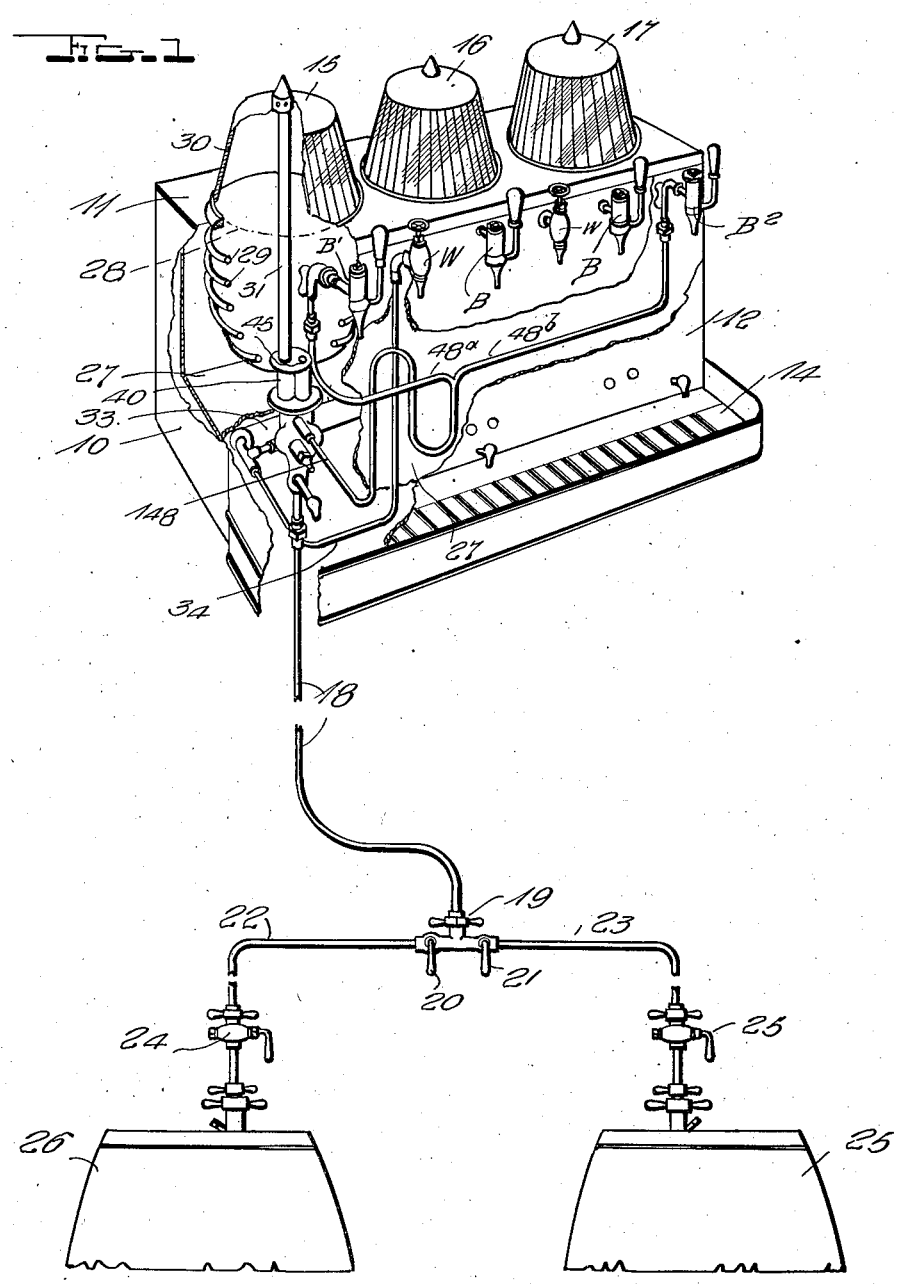
INVENTOR.
A. S. LEVIN,
BY
Attorney March 5, 1946.  A. S. LEVIN  2,395,932
BEVERAGE DISPENSING APPARATUS
Filed Oct. 3, 1940   2 Sheets-Sheet 2
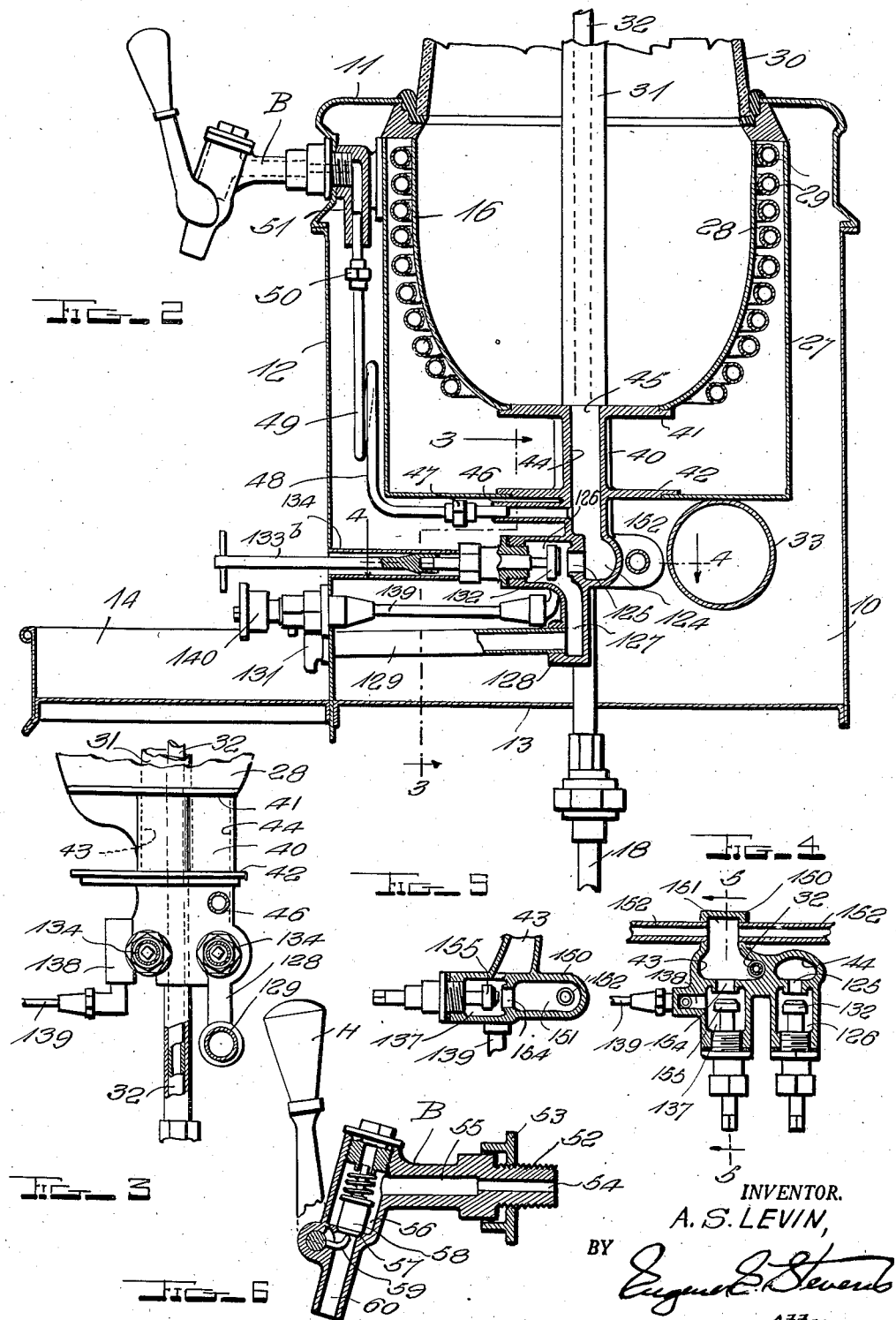
INVENTOR.
A. S. LEVIN,
BY
Attorney Patented Mar. 5, 1946

2,395,932

UNITED STATES PATENT OFFICE 2,395,932

BEVERAGE DISPENSING APPARATUS

Abraham S. Levin, Philadelphia, Pa.

Application October 3, 1940, Serial No. 359,611

7 Claims. (Cl. 225—40)

This invention relates to beverage dispensing apparatus and more particularly to the type of apparatus disclosed in the patent to John L. Norton and Abraham S. Levin, Patent No. 2,270,383, filed September 12, 1939.

With the foregoing in view, an object of the invention is to improve upon the beverage dispenser disclosed in the Norton and Levin application aforesaid, Ser. No. 294,524, filed September 12, 1939, and also to improve upon the beverage dispenser disclosed in the patent to John L. Norton, No. 2,167,309, dated July 25, 1939.

A further object is to provide in a beverage dispenser incorporating at least one container for a beverage, means for simultaneously or selectively dispensing beverage from said container at a plurality of widely separated points.

A further object is to provide in a beverage dispenser incorporating at least one dispensing container means for connecting said dispensing container to a plurality of supply containers, said connecting means including means readily accessible at the dispensing container to selectively connect any of said supply containers to said dispensing container.

A further object is to provide in association with a beverage dispensing container, of a novel multiple valve-incorporating casing for supporting said container, said casing providing drain and venting means as well as dispensing means for the beverage container; a flushing means for the container, its beverage outlet, and said drain and venting means; a support for the beverage inflow pipe; and which valve casing may also furnish means for mounting and spacing said container in a tank containing refrigerating fluid.

A further object is to provide in a beverage dispenser including at least one supply container mounted in a tank of refrigerating fluid, of means for drawing beverage from said container and dispensing the same, said means being located entirely outside said refrigerating tank.

A further object of the invention is to provide a beverage dispenser which is simple in construction, easily cleaned, economical to operate, the arrangements being such that the beverage can be readily maintained at a predetermined temperature and/or pressure.

Other objects and advantages reside in the particular structure of my invention, combination and arrangement of the several parts, and in the particular mode and method of operation, all of which will be readily understood and appreciated by those skilled in the art, upon reference to the accompanying drawings in connection with the detailed description appearing hereinafter.

In the drawings:

Figure 1 is a perspective view with parts broken away of one form of my invention;

Fig. 2 is a vertical transverse section through one of the dispensing containers shown in Fig. 1;

Fig. 3 is a longitudinal vertical section taken on the line 3—3 of Fig. 2;

Fig. 4 is a horizontal section taken on the line 4—4 of Fig. 2;

Fig. 5 is a vertical section taken on the line 5—5 of Fig. 4; and

Fig. 6 is a longitudinal vertical section taken through the spigot of Fig. 2.

Referring specifically to the drawings, wherein like reference characters have been used throughout to designate like parts, 10 designates the outer casing of a beverage dispensing unit according to the invention. The casing 10 includes a top 11, a front wall 12, a bottom wall 13, and a drain trough 14. The drain trough 14 is connected to the front wall 12 of the outer casing in any suitable manner, and is provided with a suitable drain connection, not shown. In the form shown, the casing 10 mounts the three dispensing containers 15, 16 and 17, but it is obvious that more or less than the three shown may be used and it is conceivable that but a single dispensing container may be used.

Each beverage dispensing container 15, 16 or 17 is connected by means of a supply conduit 18, T-fitting 19, branch conduits 22 and 23 and valves 24 and 25', with supply containers 26 and 25. The T-fitting 19 may include separate valves 20 or 21 for the branches thereof. It is contemplated that the supply containers 25 and 26 will be located in the basement of the building but that the T-fitting 19 together with the valves 20 and 21 will be located beneath the bar or elsewhere where they will be readily accessible to the bartender. It is obvious from the foregoing that in the event that one of the containers 25 or 26 becomes empty that one of the valves 20 or 21 will be closed to cut off the empty container while the other valves 20 or 21 is opened to connect the full container with the dispensing container without the interruption being more than a few seconds duration.

Referring to Fig. 2, which it will be noted is a section through the dispensing container 16, it is seen that an inner casing 27 is provided in spaced relation to the walls and bottom of the outer casing 10. The inner casing 27 is adapted to contain brine or other refrigerating liquid, not shown, and the casing 27 is intended to be insulated from the walls of the casing 10 by suitable insulating material, not shown. Each of the dispensing containers 15, 16 and 17 comprises a cup-like lower section 28 positioned within the casing 27 and surrounded by refrigerating coils 29 which are soldered or otherwise secured to the outer surface of the portion 28. The dispensing containers are closed by dome-like transparent portions 30 which are removably seated thereon in any suitable manner. Each dispensing container is provided with a combined vent outlet and flushing water inlet pipe 31 which encloses a beverage supply pipe 32. A drinking water supply tank 33 is located just beneath the inner casing 27 and extends longitudinally thereof. Conduits 34, only one of which is shown, lead from the water tank 33 to suitable dispensing spigots W located on the front wall 12 of the outer casing 10. As each of the parts 27 to 34, inclusive, are substantially the same as the like parts of the copending application aforesaid Ser. No. 294,524, filed September 12, 1939, it is thought that further description thereof is unnecessary.

Each cup-like portion 28 of the dispensing containers 15, 16 and 17 is supported in upwardly spaced relation from the floor of the inner casing 27 by the upper flange 41 of a multiple conduit casing 40. A lower flange 42 of each casing 40 supports the latter on the floor of the inner casing 27. The casing 40 provides a pair of separate and vertically disposed passages 43 and 44. The upper end of the passage 43 is connected in any suitable manner to the lower end of the combined vent and flushing conduit 31. The beverage supply pipe 32 also passes through the passage 43. The passage 44 opens into the cup-like receptacle 28 as at 45. Both of the passages 43 and 44 extend below the bottom wall of the casing 27 and the passage 44 has a branch conduit 46 extending laterally therefrom immediately below the bottom of the casing 27. The upper portion of passage 44 which lies between the opening 45 and the branch conduit 46, comprises a calming chamber, in which the beverage is settled or calmed and from which it is drawn off. By continuing the passage 44 below the conduit 46, a sediment trap is provided which insures against the drawing of a "muddy" beverage. The calming action of passage 44 will be described hereinafter. Any suitable means 47 connects the laterally extending conduit 46 with a beverage dispensing conduit 48 which may have a coil or convolution 49 therein and which conduit 48 is connected by any suitable means 50 with an elbow 51 to which is connected the beverage dispensing spigot or faucet B. It is to be noted that the dispensing conduit 46—51 while it is entirely outside of the refrigerating casing 27 lies very close to the walls of said casing 27 throughout the length of said conduit. Thus, there is little danger of the temperature of the beverage being raised while it is in the conduit.

As is shown in Fig. 1, the left hand beverage dispensing container 15 has a slightly different form of dispensing conduit in that the conduit 148 thereof is provided with branch conduits 48a and 48b which lead respectively to beverage dispensing spigots B' and B2 located at opposite ends of the casing 10. Thus, if the beverage contained in the dispensing container 15 is in greater demand than beverages contained in the containers 16 and 17, it may be readily dispensed from either end of the casing 10 and would be readily accessible to either of two counter men or bartenders.

Turning now to that portion of the multiple valve-incorporating casing 40, shown in Figures 2-5, which is below the beverage dispensing conduit 46, it will be noted that the drain passage 44 opens into the drain chamber 124 of valve casing 40 which communicates through the valve seat 125 with the valve chamber 126 having the outlet passage 127. Valve casing 40 has the portion 128 carrying the forwardly extending drain pipe 129 which communicates with drain passage 127 and leads out through the front wall 12 of the outer casing 10. The removable drain spout 131 on the outer end of drain pipe 129 discharges into drain pan 14, as shown.

The valve 132 which controls the drain flow through seat 125 has its stem threaded as usual in a packing gland-incorporating portion of casing 40; and the outer end of said stem is square so as to fit in the socket end of a wrench 133b which is used for opening and closing said valve 132. By preference, there will be a tube 134 (see Figure 2) through which wrench 133b is inserted.

Figures 3, 4 and 5 show the valve-incorporating casing 40 as provided with the air pressure relief chamber 137 which is separate from the drain chamber 124 and which is located alongside the latter. This air relief chamber 137 is in open communication with the air pressure relief passage 43 with which vent pipe 31 communicates. Chamber 137 has the laterally extending outlet 138 (Fig. 4) carrying the outlet pipe 139 whose outer end has a threaded socket portion which extends through front wall 12 of casing 10 and receives the rear threaded end of a relief valve 140, shown in Figure 2.

As shown, the beverage inlet pipe 32 for each container 15, 16, 17 which leads from a supply keg 25, 26 passes up through air relief passage 43 of valve casing 40, and up through the conduit 31 to a point adjacent the top thereof where it opens into container in a well known manner, not shown.

The means for flushing out and cleaning not only the entire interior of beverage dispensing containers and valve casing 40, but also all passages leading thereto and therefrom, including the beverage inlet pipe 32 will now be described.

Figures 4 and 5 show valve casing 40 as having the rearwardly extending projection 150 providing the water inflow chamber 151, and Figure 4 illustrates that each water inflow chamber 151 forms a part of a flushing water supply line 152. The remote end of the flushing water supply line is closed by a plug (not shown).

Each flushing water inflow chamber 151 is separated from its air pressure relief chamber 137 by a valve seat 154 against which a valve 155 will be kept seated except when the apparatus is to be flushed out. The flushing water control valve 155, which is similar to the drain control valve 132, works in the vent relief valve chamber 137, and its stem has a squared end to receive socket wrench 133b. The valve stem is, of course, threaded as usual in the usual packing gland-incorporating portion of valve casing 40. The manner of flushing out the apparatus and also the operation of the several valves in that portion of the casing 40 which lies below beverage conduit extension 46 is the same as in the aforesaid Patent No. 2,270,383 dated Jan. 20, 1942, and need not be described here.

Referring now to Fig. 6, it will be seen that the horizontal arm of the elbow 51 threadedly receives the threaded nipple 52 of the faucet B. Leakage is prevented by suitable packing means 53 as the beverage passes through a passage 54 of the nipple 52 into an enlarged passage 55, which is substantially horizontal. The passage 55, in turn, opens into a substantially vertical and still further enlarged valve chamber 56 having an opening in the floor thereof provided with a valve seat 57. The valve seat 57 normally receives the spring loaded valve 58 thereof to maintain the chamber 56 closed. The beverage may be readily dispensed by depressing the handle H which actuates a finger 59 to raise the valve 58 and permit the beverage to pass out of the valve chamber 56 and into the discharge spout 60.

Referring to Figs. 2 and 6, there is great advantage in the beverage dispensing passage means 44, 46, 48, 49, 54, 55, 56 and 60, and this is true not only as an entirety but also as to elements thereof, such as the calming chamber 44 of valve casing 40, the passage 54, 55, 56 of faucet B, etc. For instance, the narrow, elongated and unobstructed calming chamber 44 which receives the relatively quiescent beverage from the bottom of dispensing container 16 (Fig. 2) further calms the same. This calming action is due not only to the weight of the volume of fluid above and the fact that chamber 44 is free of obstructions, but also to the gas pressure in and above the beverage in said dispensing container 16. In other words, the beverage is packed, or given greater density so as to speak, in calming chamber 44.

Another factor in the calming of the beverage in passage from dispensing container 16 to faucet B, is the fact the outlet conduit 46 leading from calming chamber 44 is of much smaller diameter than chamber 44 so as to further confine the beverage and reduce turbulence. Similarly, the internal diameter of communicating pipe 48, 49 is smaller than that of conduit 46; and the communicating passage 54 of faucet B and that of its carrying elbow 51 is smaller still. The progressive internal diameter reduction of the beverage outflow passage from calming chamber 44 to faucet inlet passage 54 (Fig. 6) serves to confine and further calm the beverage. However, it is desirable to provide at the faucet B for limited expansion of the beverage so as to enable a foam "collar" or head to be put on the top of a glass of the beverage. This is accomplished by progressive diametric enlargement of the fluid passage of the faucet as shown at 55, 56 and 60 in Fig. 6.

While cup-like parts 28 and transparent domes 30 of the dispensing containers 15, 16 and 17 are generally similar to the like parts of the copending application, Serial No. 294,524, filed September 12, 1939, aforesaid, it is to be understood that here the cup-like portions 28 are substantially larger and the domes 30 are substantially smaller than are the like parts of said application, whereby the greater part of the beverage is located below the top of the refrigerating tank 27. This structure not only permits the refrigerating coils 29 to be longer but by locating the beverage conduit 46 below the floor of the tank 27, the coils 29 may extend right up to the top of the cup-like members 28 whereby better refrigeration of the beverage is obtained.

While I have shown and described what is now thought to be a preferred embodiment of my invention, it is to be understood that the same is susceptible of other forms of expression. Consequently, I do not limit myself to the precise structure shown and described hereinbefore except as hereinafter claimed.

I claim:

1. In a beverage dispensing device, including a counter-carried outer casing, a refrigerating casing inside said first casing and in spaced and insulated relation to said first casing, and means mounting a dispensing container in upwardly spaced relation to the floor of said inner casing; said means including supply and dispensing passages extending through the floor of said inner casing, and a dispensing conduit opening into said dispensing passage outwardly of said inner casing, a dispensing faucet carried by said outer casing, and said conduit extending along the outside of the walls of said inner casing in close relation thereto and being operatively connected to said faucet.

2. The structure of claim 1, and a restriction coil formed in said conduit.

3. The structure of claim 1, a second faucet carried by said outer casing remote from said first faucet, a conduit for said second faucet leading along the outside of a wall of said inner casing, and said second conduit being connected to said first conduit.

4. In a beverage dispensing device, including a counter-carried outer casing, a refrigerating casing inside said first casing and in spaced and insulated relation to said first casing, and means mounting a dispensing container in upwardly spaced relation to the floor of said inner casing; said means including supply and dispensing passages extending through the floor of said inner casing, and a dispensing conduit opening into said dispensing passage outwardly of said inner casing.

5. The structure of claim 4, a faucet on said conduit, said faucet having an intake passage therein of substantially larger internal diameter than the internal diameter of said conduit to permit expansion of the beverage in said passage.

6. In a beverage dispensing device, including a counter-carried outer casing, a refrigerating casing inside said first casing and in spaced and insulated relation to said first casing, and means mounting a dispensing container in upwardly spaced relation to the floor of said inner casing; said means comprising a multiple valve casing, a separate beverage supply passage, a beverage drain passage, and a combined pressure relief and flushing water inlet passage in said valve casing, all of said passages extending through the floor of said inner casing, a valve for said drain passage in said valve casing below said inner casing and in spaced relation thereto, a pressure relief conduit opening into said combined pressure relief and flushing passage below said inner casing, a flushing water control valve in said last named passage below said pressure relief conduit, and a beverage dispensing conduit opening into said drain conduit between said inner casing and said drain valve.

7. In a beverage dispensing device, including a counter-carried outer casing, a refrigerating casing inside said first casing and in spaced and insulated relation to said first casing, and means mounting a dispensing container in upwardly spaced relation to the floor of said inner casing; said means comprising a multiple valve casing, a separate beverage supply passage, a beverage drain passage, and a combined pressure relief and flushing water inlet passage in said valve casing, all of said passages extending through the floor of said inner casing, a valve for said drain passage in said valve casing below said inner casing and in spaced relation thereto, and a beverage dispensing conduit opening into said drain conduit between said inner casing and said drain valve.

ABRAHAM S. LEVIN.